United States Patent
Shiga (10) Patent No.: US 7,941,588 B2
(45) Date of Patent: May 10, 2011

(54) MULTI-LEVEL NONVOLATILE SEMICONDUCTOR MEMORY DEVICE

(75) Inventor: Hitoshi Shiga, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 859 days.

(21) Appl. No.: 11/864,074

(22) Filed: Sep. 28, 2007

(65) Prior Publication Data
US 2008/0082735 A1 Apr. 3, 2008

(30) Foreign Application Priority Data

Sep. 29, 2006 (JP) ................................. 2006-267012

(51) Int. Cl.
*G06F 12/00* (2006.01)

(52) U.S. Cl. .................. 711/103; 711/203; 711/E12.003

(58) Field of Classification Search ................... 711/106, 711/103, 154, 202, 203, 167, 207, E12.003, 711/E12.014
See application file for complete search history.

(56) References Cited

U.S. PATENT DOCUMENTS

| | | | |
|---|---|---|---|
| 2005/0218460 A1 | 10/2005 | Hasegawa et al. | |
| 2006/0274565 A1* | 12/2006 | Takashima et al. | 365/145 |
| 2008/0235467 A1* | 9/2008 | Tagawa | 711/154 |
| 2008/0244211 A1* | 10/2008 | Ito | 711/170 |

FOREIGN PATENT DOCUMENTS

| | | |
|---|---|---|
| JP | 4-237344 | 8/1992 |
| JP | 2005-268621 | 9/2005 |

* cited by examiner

*Primary Examiner* — Pierre-Michel Bataille
(74) *Attorney, Agent, or Firm* — Oblon, Spivak, McClelland, Maier & Neustadt, L.L.P.

(57) ABSTRACT

A nonvolatile semiconductor device includes a first flash memory device; a second flash memory device in which data programming and/or reading is faster than in said first flash memory device; an address conversion table which correlates a logical address of a memory cell to a physical address designating said memory cell of said first and/or said second flash memory; an interface part which accepts an access request to a memory cell, an address conversion table search part which searches a physical address an access part which accesses a memory cell a counting part which counts the number of times a physical address has been accessed and generates an access count value of said physical address; a comparison part which compares whether said access count value of said physical address is more than a threshold or not; and a transmitting part which transmits data to said second flash memory device.

19 Claims, 8 Drawing Sheets

MULTI-LEVEL NONVOLATILE SEMICONDUCTOR MEMORY DEVICE

CROSS REFERENCE TO RELATED APPLICATION

This application is based upon and claims the benefit of priority from the prior Japanese Patent Application No. 2006-267012, filed on Sep. 29, 2006; the entire contents of which are incorporated herein by reference.

BACKGROUND OF THE INVENTION

1. Field of the Invention

This invention is related to a nonvolatile semiconductor device.

2. Description of the Related Art

As one type of nonvolatile semiconductor device, there is a NAND type flash memory. A NAND type flash memory is characterized by large capacity and low cost. Among flash memories, a multi-level NAND type flash memory is now receiving attention. Recently, the development of multi-level NAND type flash memories is progressing. A multi-level NAND type flash memory can store a plurality of data bits in one memory cell.

By using a multi-level NAND type flash memory, a memory system can become large in scale. The size of data which is programmed and/or read in such a memory system can become various. In order to accommodate various data, for example, as revealed in the US patent application publication US 2005/0218460 A1, there are memory systems arranged with flash memory devices which have different capacity or access speed. Alternatively, in the field of NAND type flash memory devices, multi-level type flash memories with many storage bits per memory cell are being developed due to an increase in the capacity of data storage. A device which can store two bits of data per memory cell, for example, is widely known as one type of a multi-level NAND type flash memory. The development of a device which can store four bits of data per memory cell is also progressing.

And, in the case of a multi-level NAND type flash memory, there are cases where programming and/or read speed becomes slower as the number of bits which can be stored per memory cell increases. In this case, the functions of a memory system which utilizes a multi-level NAND type flash memory are sometimes restricted.

BRIEF SUMMARY OF THE INVENTION

A nonvolatile semiconductor device includes: a first flash memory device; a second flash memory device in which data programming and/or reading is faster than said first flash memory device; an address conversion table which correlates a logical address of a memory cell to a physical address designating said memory cell of said first and/or said second flash memory; an interface part which accepts an access request to a memory cell, said access request including a logical address of said memory cell, said memory cell being to be accessed; an address conversion table search part which searches a physical address, said physical address being correlated with said logical address by said address conversion table, said logical address being included in said access request; an access part which accesses a memory cell, said memory cell being designated by said physical address, said physical address having been searched by said address conversion table search part; a counting part which counts the number of times said physical address has been accessed and generates an access count value of said physical address; a comparison part which compares whether said access count value of said physical address is more than a threshold or not and generates a first result of said comparison; a transmitting part which transmits data to said second flash memory device, said data being stored in said memory cell, said memory cell being designated by said physical address, when said physical address is a physical address designating a memory cell of said first flash memory device and said first result shows said access count value of said physical address being more than said threshold.

DETAILED DESCRIPTION OF THE INVENTION

Below, the embodiments of this invention are explained in detail while referring to the drawings. The scope of the present invention, however, should not be considered to be limited to these embodiments.

Figure 1:
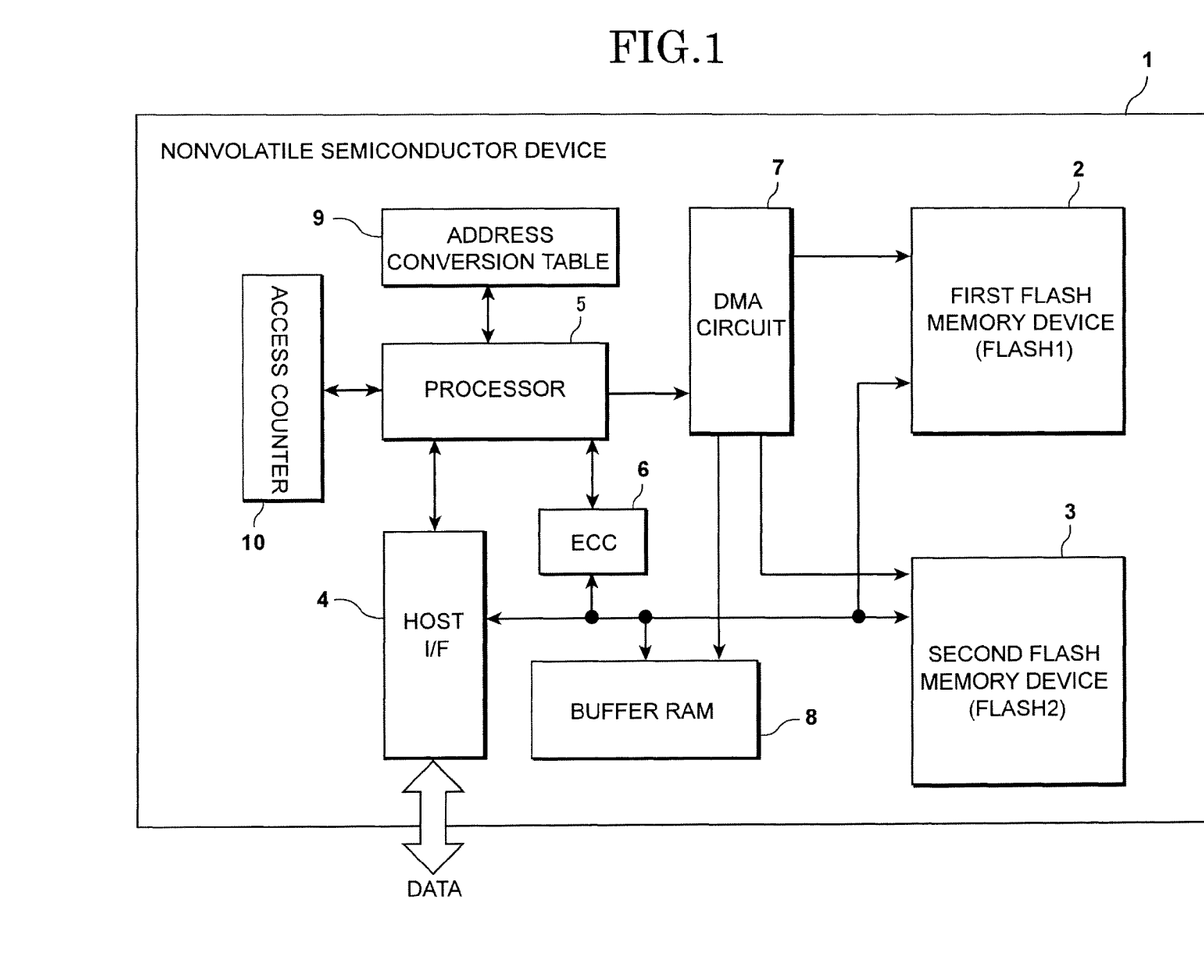
FIG. 1 is a drawing which shows a construction of a nonvolatile semiconductor device related to one embodiment of this invention.

FIG. 1 is a block drawing which shows a construction of a nonvolatile semiconductor device related to one embodiment of this invention. As shown in the drawing, the nonvolatile semiconductor device 1 is arranged with a first flash memory device 2, a second flash memory device 3, a host interface 4, a processor 5, an ECC circuit 6, a DMA 7, a buffer RAM 8, an address conversion table 9 and an access counter 10.

The first flash memory device 2, for example, is comprised using a NAND type flash memory. The second flash memory device 3 is similarly, for example, comprised using a NAND type flash memory. Here, programming and/or reading in the second flash memory device 3 is faster than in the first flash memory device 2. A device comprised by a two value NAND flash memory, for example, is used as the second flash memory device 3, and has an access speed between about 25 to 200 μs. Therefore, a device with an access speed which is slower than this is used as the first flash memory device 2. For example, as the first flash memory device 2, a device each cell of which can store a multi-value such as four, eight, etc. which can be composed of plurality of bits and hence the memory capacity of which is large, but the access speed of each cell of which becomes slower can be used.

The host interface 4 (hereinafter denoted as host I/F) is connected to an external host device (not shown in the drawings) via a bus and mediates an input and an output of a data programming request and a data reading request to the first flash memory device 2 or the second flash memory device 3 between the external host device and the processor 5.

The processor 5 controls each part within the nonvolatile semiconductor memory device 1 and carries out data programming processing or data reading processing or data transmission between the first flash memory device 2 and the second flash memory device 3. Further, a flash memory control processing program, which is explained afterward with the reference to FIG. 3, and a RAM or ROM (not shown in the drawings) which stores a threshold which is compared with the number of times a memory cell within the first flash memory device 2 is accessed etc. may be incorporated in the processor 5.

The ECC (Error Correcting Code) circuit 6 is a circuit which corrects a data error when data is read from the first flash memory device 2 or the second flash memory device 3.

The DMA circuit 7 (Direct Memory Access) is a circuit which performs, independently of the processor 5, direct transmission of data between each part of the nonvolatile semiconductor memory device 1, such as the first flash memory device 2, the second flash memory device 3, and the buffer RAM 8.

The buffer RAM 8 is a device which temporarily stores data for compensating a difference in the transmission speed or the process speed between the external host device and the internal first flash memory device 2 or the second flash memory device 3 when data is exchanged between them.

Figure 2:
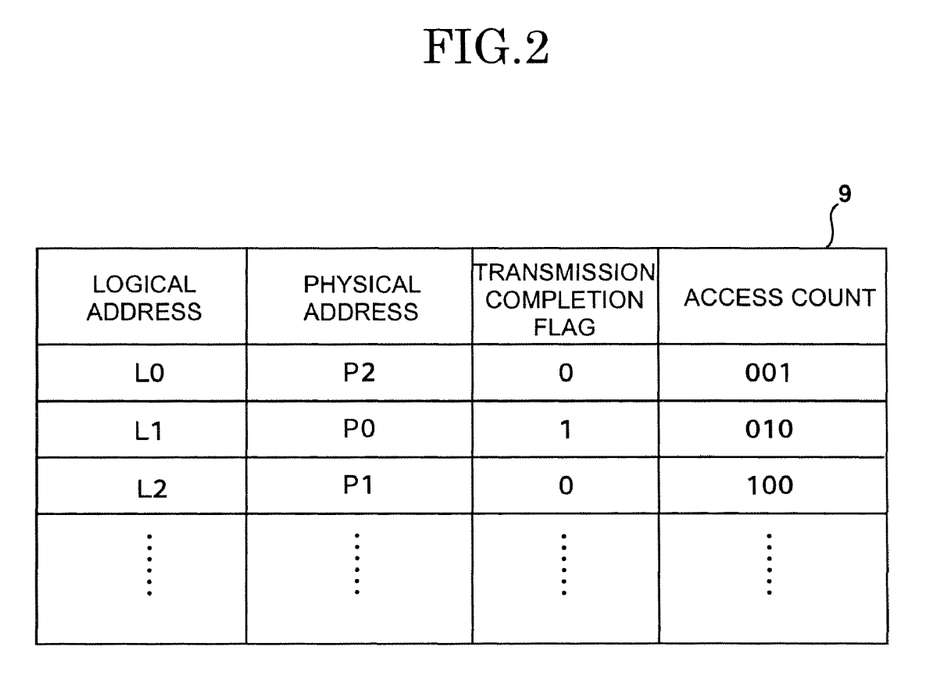
FIG. 2 is a drawing which shows one example of an address conversion table of a nonvolatile semiconductor device related to one embodiment of this invention.

The address conversion table 9 is a table which correlates a physical address of a memory cell, which is a memory cell of the first flash memory device 2 and/or the second flash memory device 3, and a logical address of this memory cell. An example of the address conversion table 9 is shown in FIG. 2. The address conversion table 9 shown in FIG. 2 is a table which correlates and stores a logical address, a physical address, a transmission completion flag, and an access count.

In the address conversion table 9, each value stored in the column denoted as 'logical address' represents a logical address which designates or points to a memory cell. In addition, in the address conversion table 9, each value stored in the column denoted as 'physical address' represents a physical address which designates or points to a memory cell. A logical address which designates a memory cell refers to an address used when the first flash memory device 2 and/or the second flash memory device 3 is accessed from an external host device. In addition, a physical address which designates a memory cell refers to an address which shows the physical position of a memory cell within the first flash memory device 2 or the second flash memory device 3 in which data is actually stored.

The transmission completion flag is a flag which shows whether the transmission of data from the first flash memory 2 to the second flush memory 3 has completed. Such a transmission of data occurs in the case when the number of accesses from an external host device to the data, which has been stored a memory cell in the first flash memory 2, surpasses a threshold set in advance. In one embodiment of the present invention, when the transmission completion flag is "0", data is stored in a memory cell of the first flash memory 2 and has not been transmitted to the second flash memory device 3. On the other hand, when the transmission completion flag is not "0", for example, when the transmission completion flag is "1", the transmission of data to the second flash memory device 3 has been completed.

In addition, the access count is an access count value which shows the number of times a memory cell has been accessed as stated above. For example, when reading of the data stored in a memory cell is requested, the number of times that memory cell is accessed increases. The number of times that memory cell is accessed may increase when that memory cell is requested to be programmed. Further, the access count value of a memory cell may be a total number of operations to a flash memory such as reading, programming, erasing, etc.

In the address conversion table 9 in FIG. 2, the value of the column named as "logical address" of one row is "L0." By storing "P2" as the value of the column named as "physical address" on the same row, "L0" and "P2" are correlated. In addition, the value of the column named as "transmission completion flag" is "0" in this row. This means that the data which is stored in a memory cell the logical address of which is "L0" has not been transmitted to the second flash memory device 3 from the first flash memory device 2. That is, it shows that the physical address "P2" is a physical address of a memory cell of the first flash memory device 2. The access counter 10 counts the number of times each physical address or each logical address has been accessed and generates each access count value. The generated access count value is stored in a row named as "access count" in the address conversion table 9. For example, "001" is stored as the access count of the memory cell the physical address of which is "P2", namely the memory cell the logical address of which is "L0."

As aforementioned, the access counter 10 counts the number of times each physical address or each logical address has been accessed and generates each access count value. For example, when a memory cell is accessed, the value of access count correlated to its physical address or its logical address is read from the address conversion table 9 and "+1" is added to that value and the result is stored back into the address conversion table 9. Therefore, when access to the memory cell the physical address of which is "P2" is requested from an external host device for example, the access counter 10 reads "001" from the address conversion table 9, adds "+1" to "001" and the result ("002") is stored in the address conversion table 9.

Figure 3:
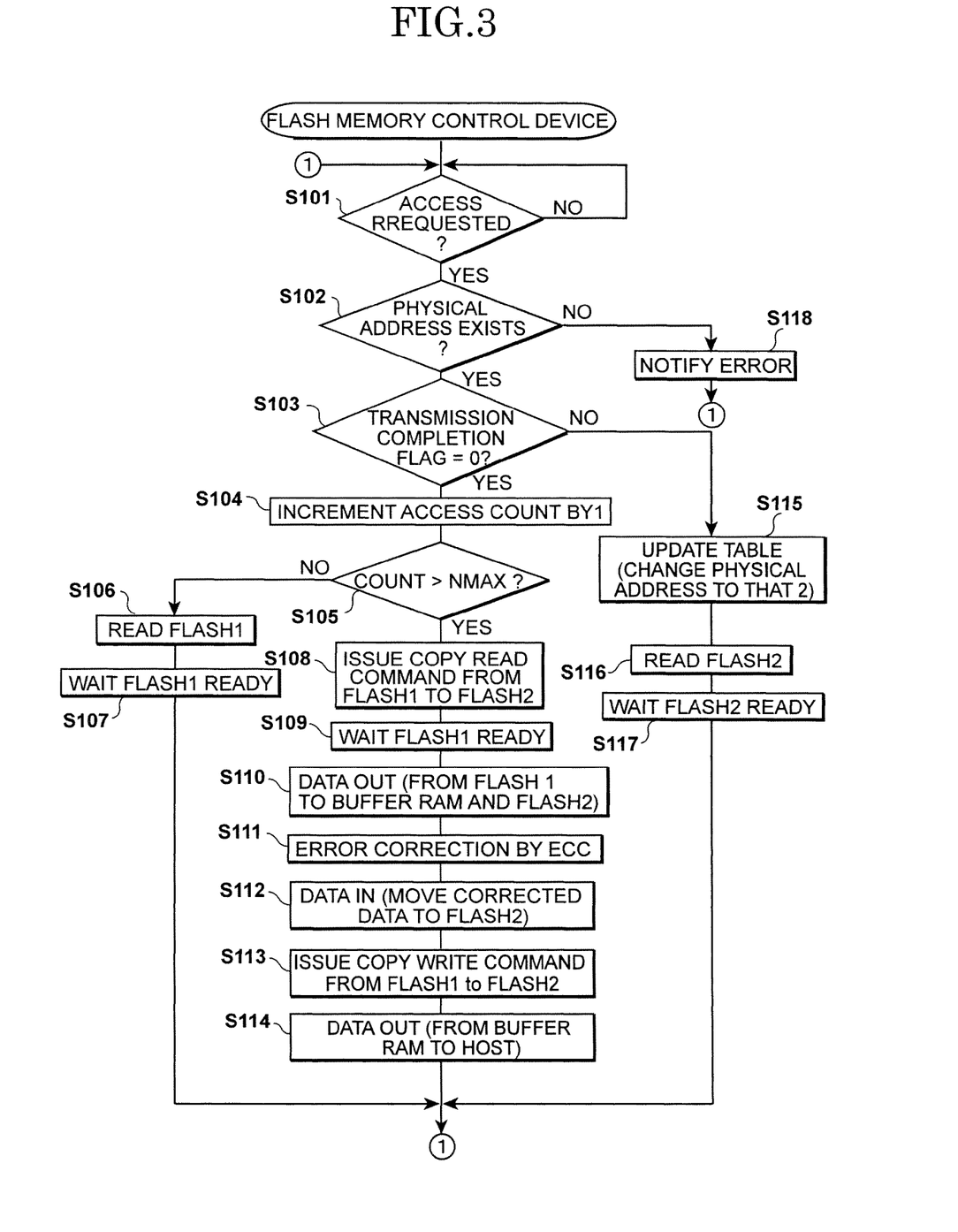
FIG. 3 is a flowchart which shows the operation of a nonvolatile semiconductor device related to one embodiment of this invention.

Next, the operation of the nonvolatile semiconductor memory device 1 in one embodiment of this invention is explained while referring to the flowchart shown in FIG. 3. FIG. 3 is a flowchart which shows mainly the operation of the processor 5 within the nonvolatile semiconductor memory device 1. Further, this operation takes place when a data read request command to a logical address corresponding to a memory cell of the first flash memory device 2 is transmitted from an external host device.

The processor 5 within the nonvolatile semiconductor memory device 1 confirms whether there is an access request from an external host device to a memory cell of the first flash memory device 2 (for example, a read request of a specific logical address of a memory cell of the first flash memory device 2) (step S101). When there is no request (the branch labeled as "NO" in step S101), the processor 5, repeats the present processing or enters a waiting state until the access request is obtained. When there is a request (the branch labeled as "YES" in step S101) the processing is moved to step S102. Next, the processor 5 searches the address conversion table 9 in FIG. 2 using the logical address specified by the access request and confirms whether there is a physical address which is correlated with this logical address (step S102). When there is no physical address (the branch labeled as "NO" in step S102), the processor 5 moves the processing to step S118. In addition, when there is a physical address (the branch labeled as "YES" in step S102), the processor 5 moves the processing to step S103.

Next, the processor 5 refers to the address conversion table 9 and confirms whether the transmission completion flag of this physical address is set at "0" (step S103). That is, the processor 5 confirms whether the transmission of the data stored at this physical address to the second flash memory device 3 is completed. When the transmission completion flag is not "0" (the branch labeled as "NO" in step S103), the processing is moved to step S115. In addition, when the transmission completion flag is "0" (the branch labeled as "YES" in step S103), the processing is moved to step S104.

As the processing in step S104, the processor 5 specifies the count up of the number of times this physical address has been accessed to the access counter 10, the access count value is counted up and "+1" is added to the access count value stored in the address conversion table 9 in FIG. 2 corresponding to this physical address.

Next, the processor 5 confirms whether the access count value of the access counter which has been added in step S104 exceeds a threshold (NMAX) (step S105). When the access count value exceeds the threshold (NMAX) (the branch labeled as "YES" in step S105), the processing is moved to step S108. Also, when the count value does not exceed the threshold (NMAX) (the branch labeled as "NO" in step S105), the processing is moved to step S106.

When the access count value exceeds the threshold (NMAX) (the branch labeled as "YES" in step S105), in order to copy the data, which is stored in a memory cell of the physical address in the first flush memory device 2, to a memory cell in the second flush memory device 3, the processor 5 issues in step S108 a data read request command specifying the physical address in the first flush memory device 2. Further, the memory cell within the second flash memory device 3, to which the data is to be copied, is selected based on a predetermined rule using this physical address within the first flash memory device 2, or is an unused memory cell for example.

For example, in the address conversion table 9 in FIG. 2, when an access count value "100" to the memory cell which is allocated with the physical address "P1" which corresponds to the logical address "L2" exceeds the threshold ("NMAX"), the data which is stored in the memory cell of the physical address (P1) within the first flash memory device 2 is transmitted to the memory cell which is allocated with a physical address within the second flash memory device 3. As a result, the data copy read request command which specifies P1 is issued to the first flash memory device 2.

Next, the processor 5 makes the state of the first flash memory device 2 a wait flash 1 ready state for data reading (step S109). This wait flash 1 ready state is a state for waiting for the reading data which is stored in the first flush memory 2 until reading becomes possible and for storing the data, which is read from the first flash memory device 2, in the buffer RAM 8. If data can be read from the first flash memory device 2, the processor 5 moves to the processing of S110, that data is read and programming is performed to the buffer RAM 8. Alternatively, using the DMA circuit 7, data is read from the first flash memory device 2 and programming may be performed to the buffer RAM 8. Also, preparations are made for outputting this data to the second flash memory device 3. Here, the preparations for outputting data to the second flash memory device 3 means, for example, notifying the second flash memory device 3 of data storage and obtaining a physical address which is allocated to, for example, an unused memory cell within the second flash memory device 3 which can store data. Further, in this way, the physical address which is obtained may be, for example, set on a predetermined register of the processor 5. In order to obtain this type of physical address makes a request for a physical address to the second flash memory device 3. Then, the processor 5 read data from the buffer RAM 8, an error correction process is performed by the ECC circuit 6 (step S111) and this corrected data is stored in the buffer RAM 8 and output to the second flash memory device 3 (step S112).

Next, the processor 5 issues a programming command to the second flash memory device 3 for transmitting the corrected data as stated above to the second flash memory device 3 from the first flash memory device 2 (step S113). At this time, the transmission maybe performed using the DMA circuit 7. If the transmission of the corrected data to a memory cell within the second flash memory device 3 from the first flash memory device 2 is completed, the processor 5 sets a transmission completion flag corresponding to the physical address within the address conversion table 9 to a value other than "0", for example "1." At this time, if there is an area in the address conversion table 9 which can further store a physical address, the physical address which was set in the above stated predetermined register of the processor 5, for example, is set in this area. Alternatively, if any physical address which designates a memory cell of the second flash memory device 3 does not become "0" then the physical address which is set in the register stated above is stored in the column of the transmission completion flag.

Next, the processor 5 moves the processing to the step S101. At this time, the access count of this physical address within the address conversion table 9 may be reset to 0.

In addition, when the count value does not exceed the threshold NMAX (the branch labeled "NO" in step S105), the processor 5 issues a data read request command (Read Flash 1) to the first flash memory device 2. Next, the processor 5 makes the first flash memory device 2 a Wait Flash 1 Ready state (step S107). If reading of data from the first flash memory device 2 becomes possible, the processor 5 reads the data from the memory cell which is allocated with the physical address, stores the data in the buffer RAM 8, the data is then read from the buffer RAM 8, error correction is performed by the ECC circuit 6, the corrected data is then stored in the buffer RAM 8 and the processing returns to step S101. Reading of the data from the first flash memory device 2 and storing in the buffer RAM 8 may be performed via the DMA circuit 7.

In addition, when the transmission completion flag is not "0" (the branch labeled as "NO" in step S103), the processor 5 updates the address conversion table 9 in FIG. 2 referring to the physical address of the memory cell of the second flush memory device 3 to which the corrected data is transmitted from the first flush memory device 2. For example, in the case where the physical address, which is not 0, corresponding to a memory cell of the second flash memory device 3, is stored in the column of the transmission completion flag, that physical address is copied to a column of the physical address. That is, this physical address within the address conversion table 9 is changed to the physical address of the second flash memory device 3.

Next, in the step S116, the processor 5 obtains a physical address which is correlated with a logical address which is included in the above stated data read request command and issues a data read request command which includes this physical address to the second flash memory device 3.

Next, the processor 5 makes the second flash memory device 3 in a state of Wait Flash 2 Ready (step S17) and reads data from the memory cell of this physical address (step S117). After this, the processor 5 stores this data in the buffer RAM 8, and next the data is read from the buffer RAM 8, an error correction process is performed by the ECC circuit 6, this error correction data is stored in the buffer RAM 8 and the process shifts to the step S101.

In addition, in the step S102 stated above, in the case where the physical address, which corresponds to a logical address included in the read request command, is not found in the address conversion table 9 (the branch labeled as "NO" in step S102), an error notification process is performed to an external host device (step S118) and the process returns to S101.

In addition, after the processing in step S110, for example, in the step S113, at the time of issuing a programming command to the second flash memory device 3, in the step S110 it is possible to make the memory cell of the first flash memory device 2, from which data is read, reusable (or released). In other words, in order to make this memory cell an unused memory cell, a flag value which determines whether the memory cell of the first flash memory device 3 is used or not is rewritten, and in the case where a new data programming request is made to the first flash memory device 2, one of such memory cells is allocated so that new data programming can be performed.

As explained above, in the nonvolatile semiconductor memory device 1 related to one embodiment of the present invention, by counting the number of times each physical address or each logical address is accessed in the first flash memory device 2, whose speed of data programming and/or reading is low, when an access count value which corresponds to a certain physical address exceeds a threshold (NMAX), the data which is stored in the memory cell which is allocated with this physical address is transmitted to the second flash memory device 3. As a result, when this data is subsequently accessed, because reading is possible from the flash memory device which can perform data programming access and data reading access at a high speed, access can be performed quickly.

Also, in the nonvolatile semiconductor memory device 1 related to one embodiment of the present invention, after the data which is stored in the memory cell which is designated by a physical address of the first flash memory device 2, is transmitted to the second flash memory device 3, the processor 5 modifies in the address conversion table the physical address which is allocated to a memory cell of the first flash memory device 2 to the physical address which is allocated to a memory cell of the second flash memory device 3. As a result, subsequent access to this data is easily performed.

In addition, in the nonvolatile semiconductor memory device 1 related to one embodiment of the present invention, as stated above, after the data which is programmed in the memory cell which is designated by a physical address of the first flash memory device 2, is transmitted to the second flash memory device 3, the processor 5 may reset the access count which corresponds to this physical address which is stored in the address conversion table 9. As a result, when the nonvolatile semiconductor memory device 1 is started again, it is possible to omit the reset process within the logical physical address register 9 and it is possible to improve the efficiency of a process.

Embodiment Two

In the embodiment explained above, the numbers of access is counted and accumulated while counting up the number of times each time an access request is received. In embodiment two, the time period for counting the number of times each memory cell is accessed is set by a timer and, for example, the situation in which the number of access times in a short period is frequent can be accommodated by the type or operation of a program which is run by an external host device.

Figure 4:
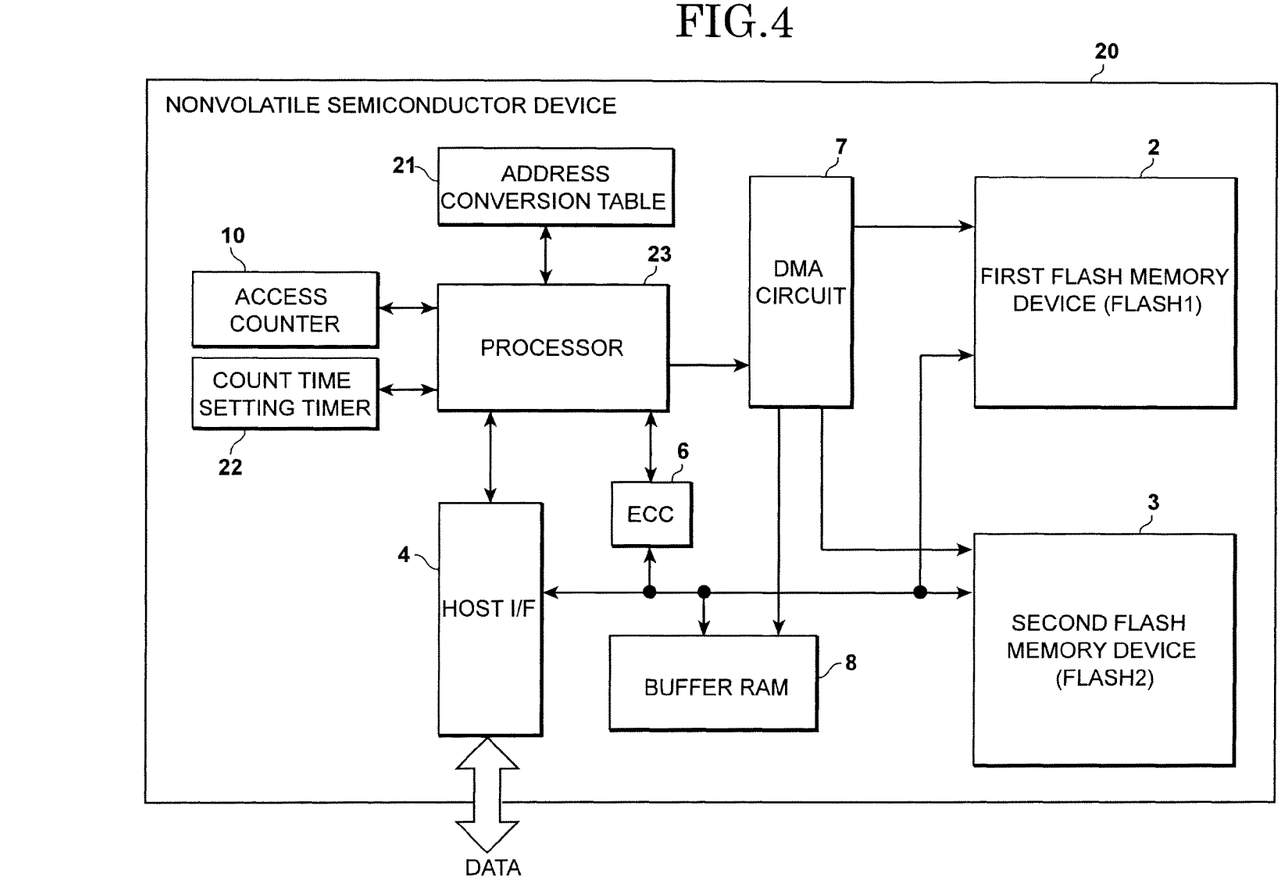
FIG. 4 is a drawing which shows a construction of a nonvolatile semiconductor device related to one embodiment of this invention.

FIG. 4 is a block drawing which shows the constriction of the nonvolatile semiconductor memory device in embodiment two of this invention. Further, in FIG. 4, because the same reference numeral are used for parts of the construction which is the same as construction shown in FIG. 1 of embodiment one, that construction is not explained again here. As is shown in the drawing, this nonvolatile semiconductor memory device 20 is arranged with a first flash memory device 2, a second flash memory device 3, a host interface 4, a processor 23, an ECC circuit 6, a DMA 7, a buffer RAM 8, an address conversion table 9, an access counter 10 and a count time setting timer 22.

Figure 5:
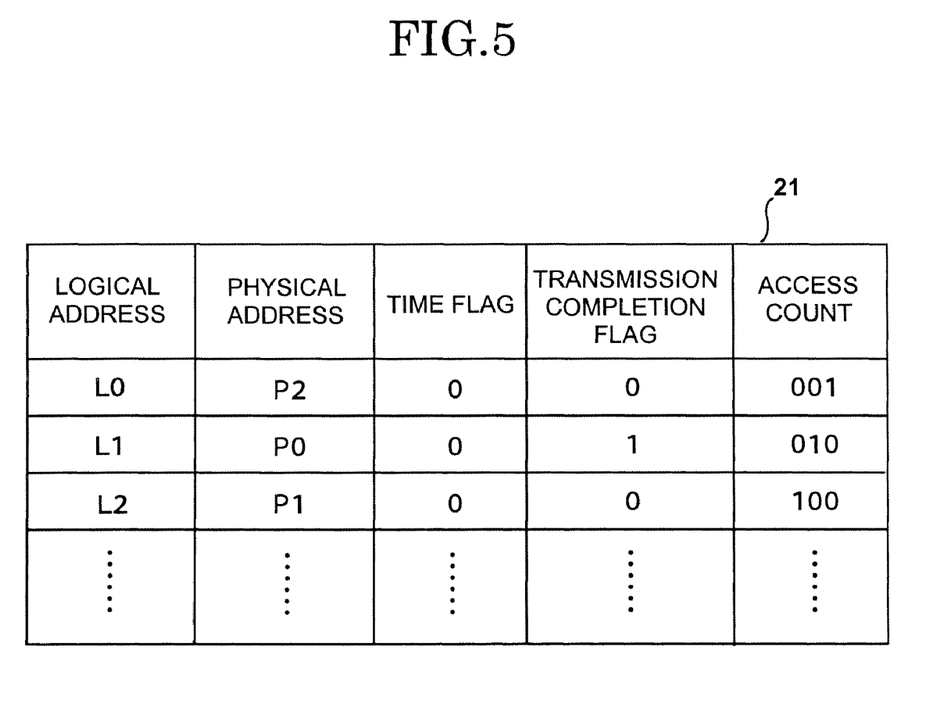
FIG. 5 is a drawing which shows one example of an address conversion table of a nonvolatile semiconductor device related to one embodiment of this invention.

The address conversion table 21 is a table to correlate a logical address which is used when access is requested from an external host device etc with a physical address within the first flash memory device 2 and/or the second flash memory device 3. One example of this address conversion table 21 is shown in FIG. 5. The address conversion table 21 shown in FIG. 5 is a table which correlates a logical address, a physical address, a time flag, a transmission completion flag, and an access counter. The time flag is a flag for notifying the time up of the count time setting timer 21, for example "0" is given as before time up and "1" is given as time up occurs.

The count time setting timer 21 is a timer which sets the count time of the access counter timer 100. The count timer setting timer 21 begins its timer operation by a start instruction input from the processor 5 and outputs a time up signal to the processor 5 when the timing up is detected.

When an access count value of a physical address of the first flash memory device 2 which is counted by the access counter 10 during the count time period set by the count time setting timer 21, exceeds a threshold (for example, the above stated NMAX or a different value), the processor 23 performs a flash memory control process operation (see FIG. 6) such as transmitting the data which is stored in this physical address to the second flash memory device 3. Further, the processor 23 may be arranged with a RAM or ROM (not shown in the drawing) which stores a flash memory control process program and a threshold (for example NMAX), which is compared with the number of times a physical address or a logical address within the first flash memory device 2, is accessed.

Figure 6:
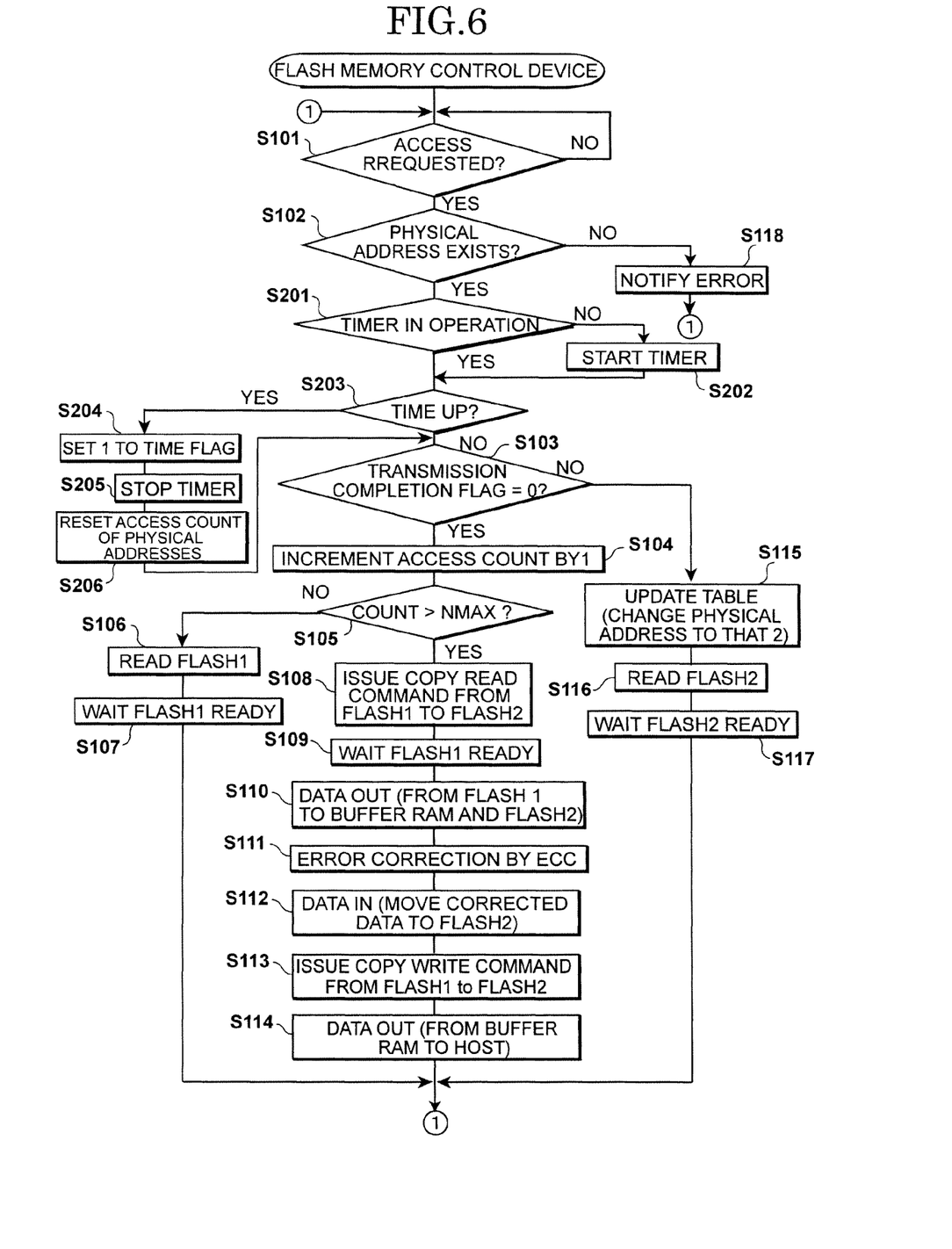
FIG. 6 is a flowchart which shows the operation of a nonvolatile semiconductor device related to one embodiment of this invention.

Next, the operation the nonvolatile semiconductor memory device 20 related to one embodiment of the present invention is explained while referring to the flow chart in FIG. 6. FIG. 6 is a flowchart which mainly shows the operation of the processor 23 within the nonvolatile semiconductor memory device 20. Further, this operation mainly explains the processing when a data read request command is transmitted from an external host device to a logical address which designates a memory cell of the first flash memory device 2 within the nonvolatile semiconductor memory device 20. Further, in the flowchart of FIG. 6, the same reference numerals are attached to the same steps as in the flowchart shown in FIG. 3 and here their explanations are omitted. In addition, the count time setting timer 22 is supplied with a drive voltage by the nonvolatile semiconductor memory device 20, and when the processor 23 is initialized, starts the timer operation by the start instruction of the processor 23.

The processor 23 within the nonvolatile semiconductor memory device 20 confirms whether there is an access request (for example, a read request including a logical address) from an external host device to the first flash memory device 2 (step S101). When there is no request (the branch labeled as "NO" in step S101), the processor 23, repeats the present process and enters a waiting state until the access request is obtained. When there is a request (the branch labeled as "YES" in step S101), the processing is moved to step S102.

Next, the processor 23 searches the address conversion table 21 in FIG. 5 using the logical address, for example, specified by the access request and confirms whether there is a physical address which is correlated with this logical address (step S102). When there is no such physical address (the branch labeled as "NO" in step S102), the processing is moved to step S118. In addition, when there is a physical address correlated with the logical address (the branch labeled as "YES" in step S102), the processing is moved to step S201.

In step S201, the processor 23 confirms whether the count time setting timer 22 is in the middle of operation. If the count time setting timer 22 is not in the middle of operation (the branch labeled as "NO" in step S201), the count time setting timer 22 is initialized (step S202) and the processing is moved to step S203. In addition, if the count time setting timer 22 is in the middle of operation (the branch labeled as "YES" in step S201), the processing is moved to step S203.

In step S203, the processor 23 confirms whether there is a time up signal input from the count time setting timer 22. If the time up signal is not input (the branch labeled as "NO" in step S203), the processing is moved to S103, if the time up signal has been input (the branch labeled as "YES" in step S203), the processing is moved to step S204.

Next, in the step S204, the processor 23 sets the time flag to be "1" of each row of the address conversion table 21 in which the processor 23 confirms that there is the above stated physical address, and the processing is moved to step S205. In the step S205, the processor 23 outputs a count stop signal to the access counter 10, the count operation of the access counter 10 is stopped and the processing is moved to step S206. In the step S206, the processor 23 resets the access counter of a memory cell of each row of the address conversion table 21 in which the processor 23 confirms that there is a physical address as stated above to the value "0" and the processing is moved to step S103.

Because the process of the following steps S103 to S117 is the same as the operation explained in the flowchart of FIG. 3 stated above, an explanation of the operation is omitted.

As explained above, in the nonvolatile semiconductor memory device 20 related to one embodiment of the present invention, a count time setting timer 22 is arranged, the time period in which the access times of the access counter 10 are counted is controlled, by counting the number of access times to each memory cell of the first flash memory device 2 within the count time period which is set by the count time setting timer 22, and when the number of access times becomes more than a threshold (NMAX or a different value) the data which is stored in this physical address is transmitted to the second flash memory device 3. As a result, because the data can be read from a high speed memory when the data is subsequently accessed, the access speed becomes faster. Consequently, an increase of access time is eliminated. Also, data storage efficiency is improved because data is divided and stored according to the frequency of access into a slow speed memory and a high speed memory. Furthermore, even in circumstances where the number of access times to specific data in a short period of time becomes frequent by a program which is running in a external host device, because data can be read from a high speed memory when this data is subsequently accessed by a program in the middle of processing, access can be performed faster. Further, the threshold in the present embodiment may be smaller than the threshold in embodiment one.

In addition, in the nonvolatile semiconductor memory device 20 relating to one embodiment of this invention, after a time up signal (timing completion) has been output from the count time setting timer 22, the processor 5 resets the access count which corresponds to the physical address within the address conversion table 21, to 0. As a result, when the processor 23, for example, restarts a program, the reset process within the address conversion table 21 is omitted and process efficiency can be improved.

Figure 7:
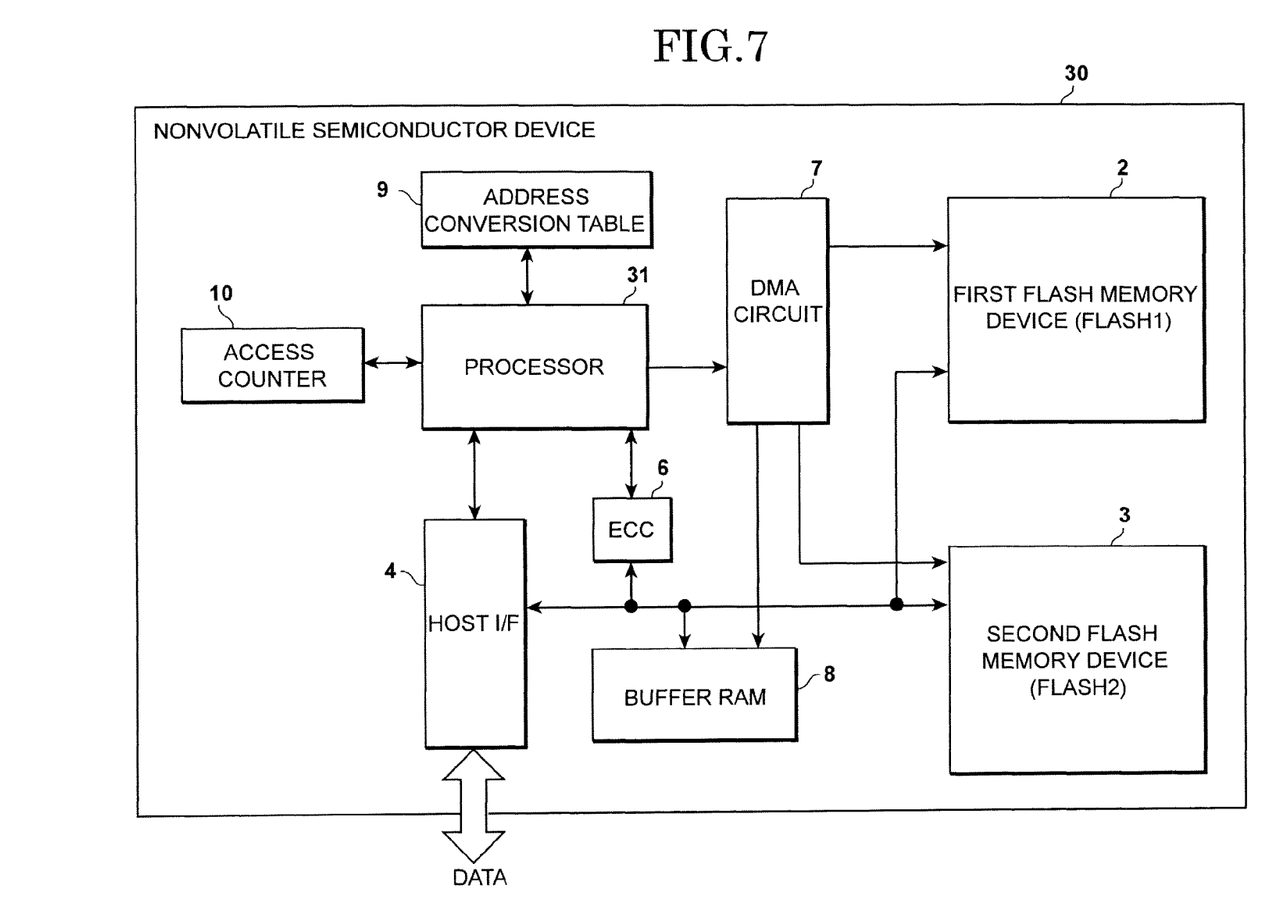
FIG. 7 is a drawing which shows a construction of a nonvolatile semiconductor device related to one embodiment of this invention.

Further, in embodiment one and embodiment two stated above, the case where the first flash memory device 2 and the second flash memory device 3 within the nonvolatile semiconductor memory device are arranged separately was shown, however, the first flash memory device 2 and the second flash memory device 3 may be divided and arranged within the same chip. In this case, access may be controlled by the plane switching to the first flash memory device 2 and the second flash memory device 3 within the same chip. The plane switching, in which two or a plurality of memory cell arrays (each memory cell array is called a plane) which do not share a sense amplifier or a row decoder within a chip, are switched in a flash memory device of a construction in which each memory cell array separately receives a page copy command etc. One example of this type of flash memory device is shown in FIG. 7. In the example shown in FIG. 7, a flash memory device 40 is shown comprising two memory cell arrays (two planes) Flash 1 and 2.

Embodiment Three

In one embodiment stated above of the present invention, the case where the numbers of access is counted and accumulated while counting up the number of times each time an access request is received is shown. Also, in another embodiment stated above of the present invention, the case where the time period for counting these access times is set by a timer, for example, the situation in which the number of access times in a short period is frequent due to the type or operation of a program, which is run by an external host device, can be accommodated, is shown. The embodiment three is characterized in that when the number of access times of data stored in the second flash memory device 3 does not exceed a threshold, this data is transmitted to the first flash memory flash device 2 and the memory cell of the second flash memory device 3 which has stored this data is released. By such construction, an effective use of high speed programming and reading in the second flash memory device 3 is realized. Further, this threshold may be the same level as NMAX in embodiment one or embodiment two or may be a different level.

FIG. 7 is a block drawing which shows a construction of a nonvolatile semiconductor memory device relating to one embodiment of this invention. Further, because the construction parts in FIG. 7 which are the same as the construction parts in FIG. 1 in embodiment one and FIG. 4 in embodiment two, have the same symbols, an explanation of their construction is omitted. As shown in the drawing, the nonvolatile semiconductor memory device 30 is arranged with a first flash memory device 2, a second flash memory device 3, a host interface 4, a processor 31, an ECC circuit 6, a DMA 7, a buffer RAM 8, an address conversion table 21, a count time setting timer 22 and an access counter 10.

The processor 31 performs transmission of data from the first flash memory device 2 to the second flash memory device 3 as explained in embodiments explained above, and further performs at a certain timing a read operation of each access count to each physical address within the second flash memory device 3, which performs high speed reading and programming of data. When an access count value to a certain physical address does not reach a threshold (NMIN: number of times for judging that that access to the memory cell is infrequent), performs a control process (see FIG. 8) of the flash memory which transmits the data which is stored in the memory cell of this physical address to the first flash memory device 2. Here, "a certain timing may" be the timing which is counted by a count time setting timer 22 or the like of the nonvolatile semiconductor memory device in one embodiment explained above. For example, when the number of access times which is counted of the data which is stored in the second flash memory device 3 in the time period which is set by the count time setting timer 22, does not exceed a threshold, this data may be transmitted to the first flash memory device 2. Further, the processor 23 may be arranged with a RAM or ROM (not shown in the drawing) which stores the flash memory control process program and a threshold (for example NMIN) which is compared by the number of times each physical address within the first flash memory device 2 and the second flash memory device 3 is accessed etc.

Figure 8:
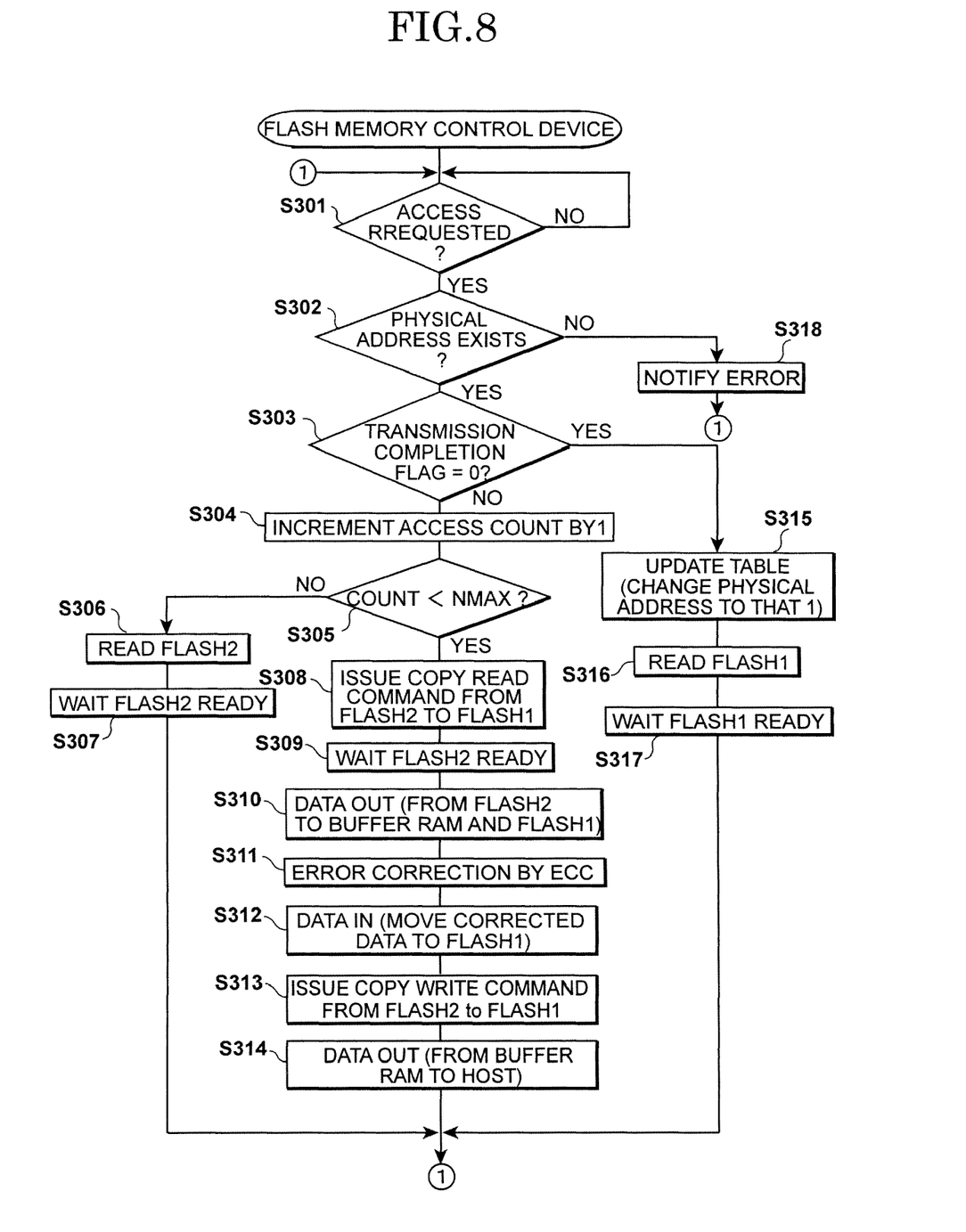
FIG. 8 is a flowchart which shows the operation of a nonvolatile semiconductor device related to one embodiment of this invention.

Next, the operation of the nonvolatile semiconductor memory device 30 in one embodiment of the present invention is explained while referring to the flowchart in FIG. 8. FIG. 8 is a flowchart which mainly shows the operation of the processor 31 within the nonvolatile semiconductor memory device 30. Further, this operation mainly explains the process when a data read request command is transmitted from an external host device to the second flash memory device 3 within the nonvolatile semiconductor memory device 30. Further, the processes in the flowchart shown in FIG. 8, do not need to be performed each time the data read request command is transmitted from an external host device to the second flash memory device 3 within the nonvolatile semiconductor memory device 30. Usually, the data which is requested to be read is read and a count up is performed of the access count to a memory cell in which this data is read. And, when a predetermined time period has elapsed or when the total number of memory cell access exceeds a threshold, the processes in the flowchart shown in FIG. 8 may be performed.

The processor 31 within the nonvolatile semiconductor memory device 1 first confirms whether there is an access request (a read request, for example, including a logical address) from an external host device to the second flash memory device 3 (step S301). When there is no request, (the branch labeled as "NO" in step S301) the processor 31, repeats the present process and enters a waiting state until the access request is received. When there is a request (the branch label as "YES" in step S301) the processing is moved to step S302.

Next, the processor 31 refers to the address conversion table in FIG. 2 or FIG. 5 using a logical address which is included, for example, in an access request and confirms whether there is a corresponding physical address (step S302). When there is no physical address (the branch labeled as "NO" in step S302), the processing is moved to step S318. Also, when there is a physical address (the branch labeled as "YES" in step S302), the processing is moved to step S303.

Next, in step S103, the processor 31 refers to the address conversion table 9 and confirms whether the transmission completion flag of this physical address is set at "0." That is, the processor 31 confirms whether the transmission of the data of this physical address to the first flash memory device 2 is completed. When the transmission completion flag is "0" (the branch labeled as YES in step S303), the processing is moved to step S315. In addition, when the transmission completion flag is a level other than "0" (the branch labeled as "NO" in step S303), the processing is moved to step S304.

Next, the processor 31 instructs the access counter 10 to count up the number of times this physical address has been accessed. The access count value is counted up and "+1" is added to the access count within the address conversion table in FIG. 2 or FIG. 5 corresponding to this count up (step S304).

Next, the processor 31 confirms whether the count level of the access counter which has been added in step S304 is less than a threshold (NMIN) (step S305). When the count value is less than the threshold (NMIN) (the branch labeled as "YES" in step S305), the processing is moved to step S308. Also, when the count value is not less than the threshold (NMIN) (the branch labeled as "NO" in step S305), the processing is moved to step S306.

In step S308, the processor 31 issues a data copy read request command from flash 2 to flash 1 to the second flash memory device 3. Next, the processor 31 makes the state of the second flash memory device 3 a wait flash ready state for data reading (Wait Flash 2 Ready) (step S309). This wait flash ready state is a state for waiting a read operation on the second flash memory device 3 to be possible in order to read data from the second flash memory device 3 and to store the data in the buffer RAM 8. If reading that data becomes possible, the processor 31 reads that data and stores it in the buffer RAM 8 and preparations are made for outputting this data to the first flash memory device 2 (step S310). Here, the preparations for outputting data to the first flash memory device 2 can include an enquiry to the first flash memory device 2 of a physical address into which the data is to be transmitted. An address of this type of memory cell, for example, may be transmitted to a specific register of the processor 31. Next, the processor 31 reads data from the buffer RAM 8, an error correction process is performed by the ECC circuit 6 (step S311) and this corrected data is stored in the buffer RAM 8 and output to the first flash memory device 2 (step S313). After this, this data which is stored in the buffer RAM 8 is output to an external host device (step S314) and the processing returns to step S301.

For example, in the address conversion table 9 in FIG. 2, an access counter of a physical address (P0) which corresponds to a logical address (L1) is "010" and when this count level is less than a threshold (NMIN), the data which is stored in the memory cell of the physical address P0 within the second flash memory device 3 is transmitted to a memory cell within the first flash memory device 2.

Next, the processor 31 makes the state of the second flash memory device 3 a wait flash ready state for data reading (step S309), reads the data from a memory cell of this physical address (P0) and stores the data in the buffer RAM 8 and makes preparations for outputting to the first flash memory device 2. Then, the processor 31 reads data from the buffer RAM 8, an error correction process is performed by the ECC circuit 6 (step S311) and this corrected data is stored in the buffer RAM 8 and output to the first flash memory device 2 (step S312).

Next, the processor 31 issues a write command (step S313) to the first flash memory device 2 to copy the error corrected data as stated above to the first flash memory device 2 (step S313), and when the transmission of the error correction data from the second flash memory device 3 to the first flash memory device 3 is completed, the transmission completion flag of this physical address within the address conversion table 9 is set to "0."

Next, the processor 31 returns the processing to the step S301 and at this time the access counter of this physical address within the address conversion table 9 may be reset to 0.

In addition, in the step S305, when the access count value by the access counter 10 is the same or larger than NMAX, in the step S306, the processor 31 issues a data read request (Read Flash 2) to the second flash memory device 3. Next, the processor 31 makes the second flash memory device 3 to be in a data read wait ready state (Wait Flash 2 Ready) (step S307). Further, here because data is not transmitted to the first flash device 2 as stated above, there is no need for preparations to output data to the first flash memory device 2. If data can be read from the second flash memory device 3, the processor 31 reads the data from a memory cell which is allocated with the physical address, the data is stored in the buffer RAM 8, data is read from the buffer RAM 8, an error correction process is performed by the ECC circuit 6, this error corrected data is stored in the buffer RAM 8 and the processing returns to the step S301.

In addition, when the transmission completion flag is "0" (the branch labeled as "YES" in the step S303), in the step S315, the processor 31 modifies the address conversion table 9 in FIG. 2 because the data has been transmitted from a memory cell of the second flash memory device 3 to a memory cell of the first flash memory. That is, this physical address within the address conversion table 9 is changed to the physical address of the first flash memory device 2. This physical address may be an address which is transmitted to a specific register of the above stated process 31, for example.

Next, in the step S316, the processor 31 obtains a physical address which corresponds to a logical address which is included in a data read request command, from the address conversion table 9 and issues a data read request command which includes this physical address to the first flash memory device 2.

Next, after the processor 31 makes the state of the first flash memory device 2 a data read ready waiting state (Wait Flash 1 Ready) (step S317), data is read from the memory cell of the physical address, that data is stored in the buffer RAM, the processor 31 reads the data from the buffer RAM 8, an error correction process is performed by the ECC circuit 6, that correction data is stored in the buffer RAM 8, and the processing returns to step S301.

In addition, in the above stated step S302, when there is no physical address which corresponds to a logical address which is included in the read request command, in the address conversion table 9 (the branch labeled as "NO" in the step S302), an error notification process is performed to an external host device (step S318) and the processing returns to step S301.

As explained above, in the nonvolatile semiconductor memory device 30 relating to one embodiment of the present invention, the number of access times to each physical address within the second flash memory device 3 which can program and read data at a high speed, is counted and in the case where an access count value to a certain physical address is lower than a threshold (NMIN), the data which is stored in a memory cell of this physical address is transmitted to the first flash memory device 2. As a result, because it is possible to read data with few access frequencies when it is subsequently accessed, from a low speed area, it is possible to effectively use the area of the second flash memory device 3. Also, because the data is divided into a low speed area or a high speed area by the frequency of access, the efficiency of data storage is improved.

What is claimed is:

1. A method for controlling a nonvolatile semiconductor memory device including a first flash memory device and a second flash memory device in which data programming and/or reading is faster than said first flash memory device, said method comprising:
   searching a physical address of a memory cell correlated with a logical address included in an access request;
   accessing a memory cell designated by said physical address;
   creating an access count number by counting how many times a memory cell has been accessed; and
   transmitting data stored in said memory cell to said second flash memory device in the case where said memory cell is placed in said first flash memory device and said access count number is more than a threshold;
   wherein said second flash memory device is arranged using a two value NAND flash memory and said first flash memory device is arranged using a multi-value NAND flash memory of more than two values.

2. The method for controlling said nonvolatile semiconductor memory device according to claim 1, wherein said access count is reset in the case where said data is transmitted to said second flash memory device.

3. The method for controlling said nonvolatile semiconductor memory device according to claim 1, wherein said memory cell designated by said physical address is released after data stored in said memory cell has been transmitted to said second flash memory device.

4. The method for controlling said nonvolatile semiconductor memory device according to claim 1, wherein said physical address which is correlated with said logical address is changed to another physical address designating a memory cell of said second flash memory device to which said data is transmitted.

5. The method for controlling said nonvolatile semiconductor memory device according to claim 1 further comprising timing a timing period at the elapse of which said access count number is created for each memory cell placed in said first flash memory device.

6. The method for controlling said nonvolatile semiconductor memory device according to claim 1 further comprising:
   timing a second time period at the elapse of which said access count number is created for each memory cell placed in said second flash memory device is created; and
   transmitting data stored in a memory cell placed in said second flash memory device to said first flash memory device in the case where said access count number for said memory cell is less than a second threshold.

7. A nonvolatile semiconductor device comprising:
   a first flash memory device arranged using a multi-value NAND flash memory of more than two values;
   a second flash memory device arranged using a two value NAND flash memory in which data programming and/or reading is faster than said first flash memory device;
   an address conversion table which correlates a logical address of a memory cell to a physical address designating said memory cell of said first and/or said second flash memory;
   an interface part which accepts an access request to a memory cell, said access request including a logical address of said memory cell, said memory cell being to be accessed;
   an address conversion table search part which searches a physical address, said physical address being correlated with said logical address by said address conversion table, said logical address being included in said access request;

an access part which accesses a memory cell, said memory cell being designated by said physical address, said physical address having been searched by said address conversion table search part;

a counting part which counts the number of times said physical address has been accessed and generates an access count value of said physical address;

a comparison part which compares whether said access count value of said physical address is more than a threshold or not and generates a first result of said comparison;

a transmitting part which transmits data to said second flash memory device, said data being stored in said memory cell, said memory cell being designated by said physical address, when said physical address is a physical address designating a memory cell of said first flash memory device and said first result shows said access count value of said physical address being more than said threshold.

8. The nonvolatile semiconductor memory device according to claim 7, wherein said number of times counted for said physical address by said counting part is reset in the case where said transmitting part transmits data to said second flash memory device, said data having been stored in a memory cell of said physical address of said first flash memory device.

9. The nonvolatile semiconductor memory device according to claim 7, wherein said correlation of said logical address and said physical address by said address conversion table is changed so that said logical address is correlated to another physical address, said another physical address designating a memory cell of said second flash memory device to which said transmitting part transmits said data.

10. The nonvolatile semiconductor memory device according to claim 9, wherein said another physical address of said second flash memory is a physical address of an unused memory cell.

11. The nonvolatile semiconductor memory device according to claim 7, wherein said counting part is arranged with a timing part which times a time period in which said counting part counts said number of times, said timing part outputting a timing completion signal, and said comparison part generating said first result on receiving said timing completion signal.

12. The nonvolatile semiconductor memory device according to claim 7, wherein said comparison part generates a second result which shows whether said access count value is less than a second threshold or not, and said transmitting part transmits said data to said first flash memory device when said comparison part generates said second result showing said access count value is less than said second threshold and said data having being stored in a memory cell of the second flash memory device.

13. The nonvolatile semiconductor memory device according to claim 12, wherein said counting part is arranged with a second timing part which times a second time period in which said counting part counts a number of access times, said second timing part outputting a second timing completion signal, said counting part stopping the counting of said access times when said second timing completion signal is output from said second timing part, and said comparison part generates said second result.

14. The nonvolatile semiconductor memory device according to claim 12, wherein said physical address which is correlated with said logical address by said address conversion table is changed to a physical address of said first flash memory device in the case where data which is stored in said second flash memory is transmitted to said first flash memory device by said transmitting part.

15. The nonvolatile semiconductor memory device according to claim 7, wherein said memory cell designated by said physical address is released as unused after data stored in said memory cell has been transmitted to said second flash memory device by said transmitting part.

16. A nonvolatile semiconductor memory device comprising:

a first flash memory device arranged using a multi-value NAND flash memory of more than two values;

a second flash memory device arranged using a two value NAND flash memory in which data programming and/or reading is faster than said first flash memory device;

an address conversion table which correlates a logical address of a memory cell to a physical address designating said memory cell of said first and/or said second flash memory;

an interface part which accepts an access request to a memory cell, said access request including a logical address of said memory cell, said memory cell being to be accessed;

a counting part which counts the number of times said memory cell designated by said physical address correlated to said logical address by said address conversion table is accessed, said logical address being included in said access request and generates an access count value;

a comparison part which compares whether said access count value is more than a threshold or not and generates a first result of said comparison;

a transmitting part which transmits data to said second flash memory device, said data being stored in said memory cell, said memory cell being designated by said physical address, when said physical address is a physical address designating a memory cell of said first memory device and said first result shows said access count value of said physical address being more than said threshold.

17. The nonvolatile semiconductor memory device according to claim 16, wherein said number of times counted by said counting part for said physical address correlated with said logical address by said address conversion table is reset in the case where said transmitting part transmits data to said second flash memory device, said data having been stored in a memory cell of said physical address of said first flash memory device.

18. The nonvolatile semiconductor memory device according to claim 16, wherein said counting part is arranged with a timing part which times a time period in which said counting part counts said number of times, said timing part outputting a timing completion signal, and said comparison part generating said first result on receiving said timing completion signal.

19. The nonvolatile semiconductor memory device according to claim 18, wherein said comparison part generates a second result which shows whether said number of times is less than a second threshold or not, and said transmitting part transmits said data to said first flash memory device when said comparison part generates said second result showing said access count value is less than said second threshold and said data having being stored in a memory cell of the second flash memory device.

* * * * *